(12) United States Patent
Kitajima et al.

(10) Patent No.: US 11,200,632 B2
(45) Date of Patent: Dec. 14, 2021

(54) IMAGE PROCESSING METHOD AND IMAGE PROCESSING APPARATUS

(71) Applicant: CANON KABUSHIKI KAISHA, Tokyo (JP)

(72) Inventors: Hiroshi Kitajima, Saga (JP); Kei Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 16/661,262

(22) Filed: Oct. 23, 2019

(65) Prior Publication Data
US 2020/0151844 A1 May 14, 2020

(30) Foreign Application Priority Data

Nov. 9, 2018 (JP) .............................. JP2018-211413
Oct. 9, 2019 (JP) .............................. JP2019-185678

(51) Int. Cl.
| | |
|---|---|
| G06T 1/00 | (2006.01) |
| G06K 9/00 | (2006.01) |
| G06T 7/73 | (2017.01) |
| G06T 7/13 | (2017.01) |
| B25J 9/16 | (2006.01) |

(52) U.S. Cl.
CPC ........ *G06T 1/0014* (2013.01); *G06K 9/00026* (2013.01); *G06T 7/13* (2017.01); *G06T 7/74* (2017.01); *B25J 9/1697* (2013.01)

(58) Field of Classification Search
CPC ............... B25J 9/1697; G06K 9/00026; G06K 9/00664; G06K 9/6215; G06T 1/0014; G06T 7/13; G06T 7/74
See application file for complete search history.

(56) References Cited

U.S. PATENT DOCUMENTS

| | | | |
|---|---|---|---|
| 9,135,519 B2 | 9/2015 | Kitajima | .............. G06K 9/4638 |
| 9,805,443 B2 * | 10/2017 | Kitajima | .................. G06T 7/74 |
| 10,055,670 B2 * | 8/2018 | Konishi | ............... G06K 9/4604 |

(Continued)

FOREIGN PATENT DOCUMENTS

| | | |
|---|---|---|
| JP | 2001-148014 | 5/2001 |
| JP | 2003-216931 | 7/2003 |

(Continued)

*Primary Examiner* — Ian L Lemieux
(74) *Attorney, Agent, or Firm* — Venable LLP

(57) ABSTRACT

An image processing apparatus includes a provisional model generation portion, a matching score obtaining portion, an evaluation portion, and a determination portion. The provisional model generation portion is configured to generate a plurality of provisional models. The matching score obtaining portion is configured to perform the pattern matching between each of the plurality of provisional models and each of a plurality of evaluation images, and obtain a first matching score group that is a set of first matching scores indicating a highest degree of similarity and a second matching score group. The evaluation portion is configured to calculate an evaluation value from the first matching score group and the second matching score group. The determination portion is configured to determine a matching model from among the plurality of provisional models on a basis of the calculated evaluation value.

20 Claims, 16 Drawing Sheets

(56) References Cited

U.S. PATENT DOCUMENTS

| 2012/0170834 A1* | 7/2012 | Wang | G06K 9/6265 |
| | | | 382/159 |
| 2012/0170835 A1* | 7/2012 | Wang | G06K 9/6265 |
| | | | 382/159 |
| 2016/0110840 A1 | 4/2016 | Odagiri | G06T 1/0014 |

FOREIGN PATENT DOCUMENTS

| JP | 2005-031908 | 2/2005 |
| JP | 2008-165394 | 7/2008 |
| JP | 2016-081264 | 5/2016 |

\* cited by examiner (PRIOR ART)

FIG.14

| EVALUATION IMAGE | FIRST MATCHING SCORE | SECOND MATCHING SCORE |
|---|---|---|
| 1 | 0.95 | 0.67 |
| 2 | 0.99 | 0.55 |
| 3 | 0.87 | 0.62 |
| 4 | 0.98 | 0.43 |
| 5 | 0.97 | 0.59 |

1401    1402    1403

IMAGE PROCESSING METHOD AND IMAGE PROCESSING APPARATUS

BACKGROUND OF THE INVENTION

Field of the Invention

The present invention relates to an image processing method, an image processing apparatus, a manufacturing system, and a manufacturing method of a product, particularly to an image processing method, an image processing apparatus, a manufacturing system, and a manufacturing method of a product that utilize pattern matching.

Description of the Related Art

In a field of image processing, pattern matching is well known as a method of detecting a position of a detection target object. To perform pattern matching, a reference image in which the detection target object is captured in an ideal condition is used as reference information of the detection target object. This reference image is sometimes also referred to as a model, a template, or the like. Only a region near the detection target object is cut out from the reference image, and thus a model to be used for pattern matching is generated.

In an actual object detection step, a search target image for detecting an object is captured, and a degree of similarity to the model is calculated at each position in the captured image. In this method, a position in the image whose degree of similarity is the highest is set as a detection position. That is, this method is a method of detecting a position that is the most similar to the model in the search target image.

A plurality of methods are known as methods for calculating the degree of similarity described above, and examples thereof include sum of absolute difference: SAD and normalized cross-correlation: NCC in which the degree of similarity is calculated on the basis of brightness, and shape pattern matching in which the degree of similarity is calculated on the basis of an edge feature.

In pattern matching of this kind, sometimes a problem of erroneous detection in which, for example, a position not corresponding to the detection target object is detected arises. For example, the erroneous detection occurs in the case where a position not corresponding to the detection target object has a higher degree of similarity than a position corresponding to the detection target object. For example, a case where an image as illustrated in FIG. 1A is provided and pattern matching of detecting a position of a small circle in a ring workpiece 100 in the image is performed is assumed. Reference signs 101 and 102 denote images of other workpieces or the like captured as the background of the ring workpiece 100. In this case, an image of a model 1012 as illustrated in FIG. 1B is sometimes generated. The model 1012 illustrated in FIG. 1B is generated from an image obtained by cutting out a portion of a template corresponding to a small circular portion 1011 of the ring workpiece 100. In the case of using the model 1012, sometimes the position of a circle 101 that is not related to the ring workpiece 100 and is also captured in the image is erroneously detected. To suppress such erroneous detection, a user needs to generate a model image that also includes a ring portion of the ring workpiece 100.

As described above, how frequently erroneous detection occurs changes depending on what shape is used as the model, which region is cut out to be used from a template, and the like. Therefore, conventionally, trial and error are required for generating a model for pattern matching, and sometimes detailed settings based on empirical rules of a user are required. This operation requires skills.

In addition, pattern matching of this kind is sometimes performed on an image obtained by imaging a workpiece or a manufacturing apparatus in a manufacturing line of a product, and results thereof are sometimes used for monitoring, manufacture control and the like. In the case where erroneous detection occurs in such a system, there is a possibility that a defective product is manufactured or breakdown of a manufacturing apparatus occurs due to erroneous operation thereof. Therefore, a method and a system that generate a model with which erroneous detection is unlikely to occur and reliable pattern matching can be performed are desired.

Considering this point, Japanese Patent Laid-Open No. 2008-165394 proposes a method of performing pattern matching between a captured image and all of a plurality of different models that are prepared in advance. In this case, a position where overlap with the model is the largest among a plurality of positions is set as a detection position. Further, this document also describes a method of reducing the possibility of erroneous detection by performing pattern matching using a plurality of models.

In addition, in Japanese Patent Laid-Open No. 2001-148014, a plurality of models is generated, pattern matching is performed on an evaluation image, and a degree of similarity, that is, a score in each position of the evaluation image is stored in this case. Then, a score distribution is generated for each model, and a model with which erroneous detection is unlikely to occur is selected by comparing the variance of the score distribution. In Japanese Patent Laid-Open No. 2001-148014, for example, a model whose variance of the score distribution is the largest is selected as a model with which erroneous detection is unlikely to occur, and, in an actual object detection step, erroneous detection is suppressed by performing the pattern matching by using only the selected model.

According to the configuration of Japanese Patent Laid-Open No. 2008-165394 described above, pattern matching is performed by using a plurality of models in an actual image inspection step, and therefore the processing time increases by an amount corresponding to the number of the models. Pattern matching is used for various applications, and reduction of the cycle time of manufacture is viewed as important particularly in industrial applications and in factory automation: FA. The configuration of Japanese Patent Laid-Open No. 2008-165394 may not be suitable for such applications for which high-speed processing is desired.

In addition, according to the configuration of Japanese Patent Laid-Open No. 2001-148014, the models are evaluated by how large the variance of the score distribution is. However, there is a possibility that a model whose variance of score distribution is large for all images captured in various manufacturing systems is not necessarily a model with which erroneous detection is unlikely to occur. The technique of Japanese Patent Laid-Open No. 2001-148014 is based on an assumption that, in the case where the possibility of erroneous detection is low, the score is high at only a correct position and low at other positions and thus the variance of the score distribution becomes large. In addition, this technique is also based on an assumption that, in the case where the possibility of erroneous detection is high, the score is universally high at all positions and thus the variance of the score distribution becomes small. However, the shape of the score distribution differs greatly depending on background, noises, the shape of the workpiece, and the like, in an actual image captured in a manufacturing system, and therefore there is a possibility that the evaluation criteria using the variance of the score distribution as in Japanese Patent Laid-Open No. 2001-148014 do not have versatility or generality. For example, it is expected that, in an image captured by an actual manufacturing system, the variance becomes sometimes large in a score distribution of high possibility of erroneous detection in which a plurality of peaks appears.

SUMMARY OF THE INVENTION

According to a first aspect of the present invention, an image processing method includes a provisional model generation step of generating a plurality of provisional models for pattern matching by using a reference image in which a target object of the pattern matching is recorded, a matching score obtaining step of performing the pattern matching between each of the plurality of provisional models and each of a plurality of evaluation images in which the target object of the pattern matching is recorded, thus obtaining a matching score between each of the plurality of provisional models and each of the plurality of evaluation images, and obtaining, for each of the plurality of provisional models, a first matching score group that is a set of first matching scores each of which is a first matching score indicating a highest degree of similarity in one of the evaluation images and a second matching score group that is a set of second matching scores each of which is a second matching score indicating a lower degree of similarity than the first matching score in the one of the evaluation images, an evaluation step of calculating an evaluation value from the first matching score group and the second matching score group for each of the plurality of provisional models, and a determination step of determining a matching model from among the plurality of provisional models on a basis of the calculated evaluation value.

According to a second aspect of the present invention, an image processing apparatus includes a provisional model generation portion, a matching score obtaining portion, an evaluation portion, and a determination portion. The provisional model generation portion is configured to generate a plurality of provisional models for pattern matching by using a reference image in which a target object of the pattern matching is recorded. The matching score obtaining portion is configured to perform the pattern matching between each of the plurality of provisional models and each of a plurality of evaluation images in which the target object of the pattern matching is recorded, thus obtain a matching score between each of the plurality of provisional models and each of the plurality of evaluation images, and obtain, for each of the plurality of provisional models, a first matching score group that is a set of first matching scores indicating a highest degree of similarity in the respective evaluation images and a second matching score group that is a set of second matching scores indicating a lower degree of similarity than the first matching score in the respective evaluation images. The evaluation portion is configured to calculate an evaluation value from the first matching score group and the second matching score group for each of the plurality of provisional models. The determination portion is configured to determine a matching model from among the plurality of provisional models on a basis of the calculated evaluation value.

Further features of the present invention will become apparent from the following description of exemplary embodiments with reference to the attached drawings.

BRIEF DESCRIPTION OF THE DRAWINGS

FIG. 14 is a table for describing an evaluation value calculation method according to the first exemplary embodiment of the present invention.

DESCRIPTION OF THE EMBODIMENTS

Exemplary embodiments of the present invention will be described with reference to attached drawings. To be noted, configurations described below are merely examples, and, for example, details of the configurations can be appropriately modified by one skilled in the art within the scope of the present invention. In addition, numerical values described in the exemplary embodiments are merely reference values, and should not limit the present invention.

First Exemplary Embodiment

Figure 1A:
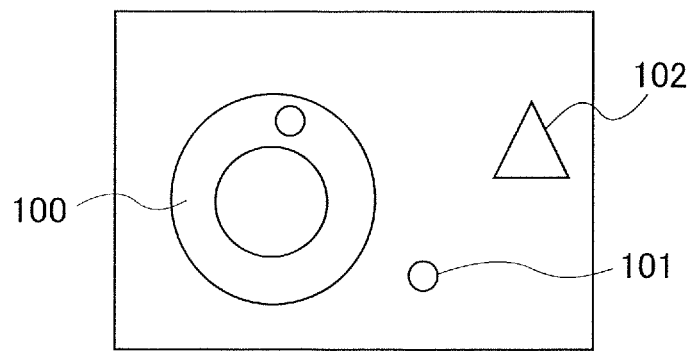
FIG. 1A illustrates an example of an image in which a plurality of workpieces is captured.
Figure 1B:
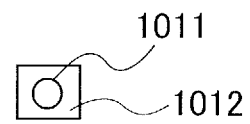
FIG. 1B illustrates an example of a model used for pattern matching processing.
Figure 2:
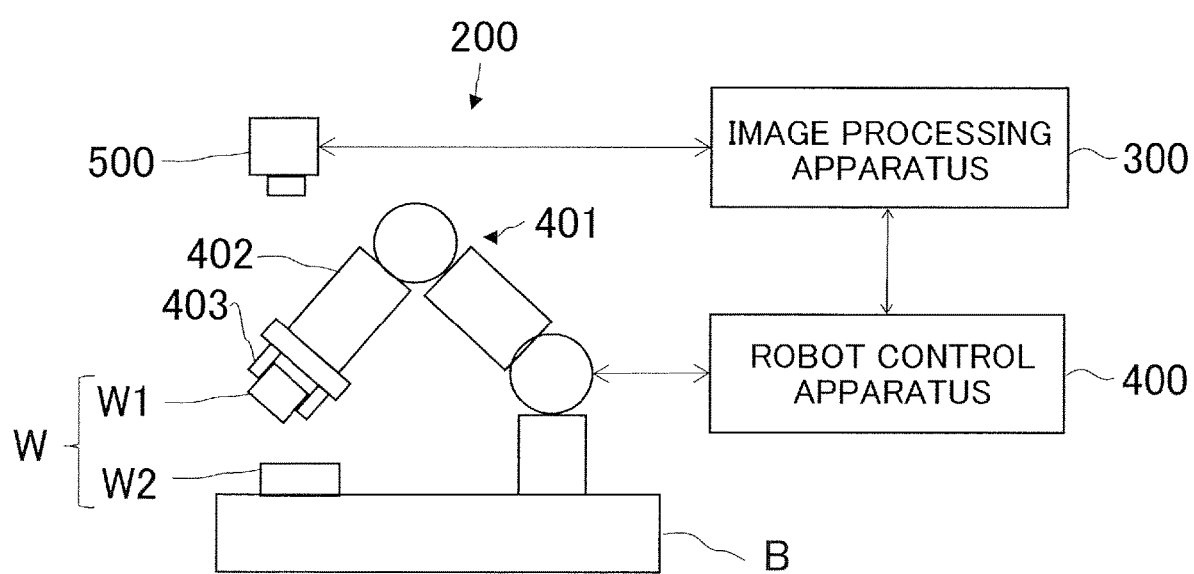
FIG. 2 is an explanatory diagram illustrating a schematic configuration of a manufacturing system according to an exemplary embodiment.

FIG. 2 illustrates a schematic configuration of a manufacturing system according to the present exemplary embodiment. A manufacturing apparatus 200 of FIG. 2 mounts a workpiece W1 serving as a target object on a workpiece W2 serving as an assembly target object to manufacture a product W. The manufacturing apparatus 200 includes a robot 401, a camera 500 serving as an image capturing apparatus, and an image processing apparatus 300 configured to communicate with the camera 500 by wired or wireless communication. In addition, the manufacturing apparatus 200 includes a robot control apparatus 400 connected to the robot 401 and the image processing apparatus 300 via a network or a control line.

The robot 401 includes, for example, a vertically articulated robot arm 402 and a robot hand 403 serving as an end effector. The robot arm 402 has a configuration in which a plurality of links is pivotably interconnected via a plurality of joints. A proximal end of the robot arm 402, which is a proximal end link or a base portion, is fixed to an upper surface of a base B. In addition, the robot hand 403 is attached to a distal link serving as a distal end link of the robot arm 402. The robot hand 403 includes a plurality of fingers, and is capable of holding and releasing the workpiece W1 serving as a target object.

A camera 500 is constituted by, for example, a digital camera. An image sensor of the camera 500 is constituted by, for example, an image sensor such as a charge coupled device: CCD sensor or a complementary metal oxide semiconductor: CMOS sensor.

The image processing apparatus 300 controls an image capturing operation of the camera 500, for example, controls an image capturing timing and a shutter speed, and obtains a captured image from the camera 500. In addition, the image processing apparatus 300 performs image processing on digital image data, and outputs a result of the image processing to the robot control apparatus 400. The image processing apparatus 300 performs pattern matching processing as this image processing.

In a manufacturing line constituted as illustrated in FIG. 2, pattern matching is performed to detect or measure an actual position or orientation of the entirety or a part of the workpieces W1 and W2, a specific portion of the robot arm 402, or the like. Therefore, in this pattern matching, a model for matching a specific portion of the workpieces W1 and W2, the robot arm 402, or the like is used. The image processing apparatus 300 outputs the image processing result to the robot control apparatus 400. The format of the data output to the robot control apparatus 400 at this time can be arbitrarily selected, and examples thereof that can be considered include coordinate values of the specific portion of the measurement target in a global coordinate system or a coordinate system of the captured image. It is assumed that the positional relationship between the installed position of the camera 500 and a working space in which the robot arm 402 operates is already known and coordinate conversion calculation between, for example, the coordinate system of the captured image and the global coordinate system of the working space of the robot arm 402 is possible. Such coordinate conversion calculation is appropriately performed by the image processing apparatus 300 or the robot control apparatus 400.

The robot control apparatus 400 controls the operation of the robot 401 on the basis of the result of image processing performed by the image processing apparatus 300. For example, in an operation of joining the workpieces W1 and W2 together, the robot control apparatus 400 controls the positions and orientations of the robot arm 402 and the robot hand 403 such that the workpieces are joined in a predetermined positional relationship with reference to the positional relationship between the workpieces obtained by the image processing.

Figure 3:
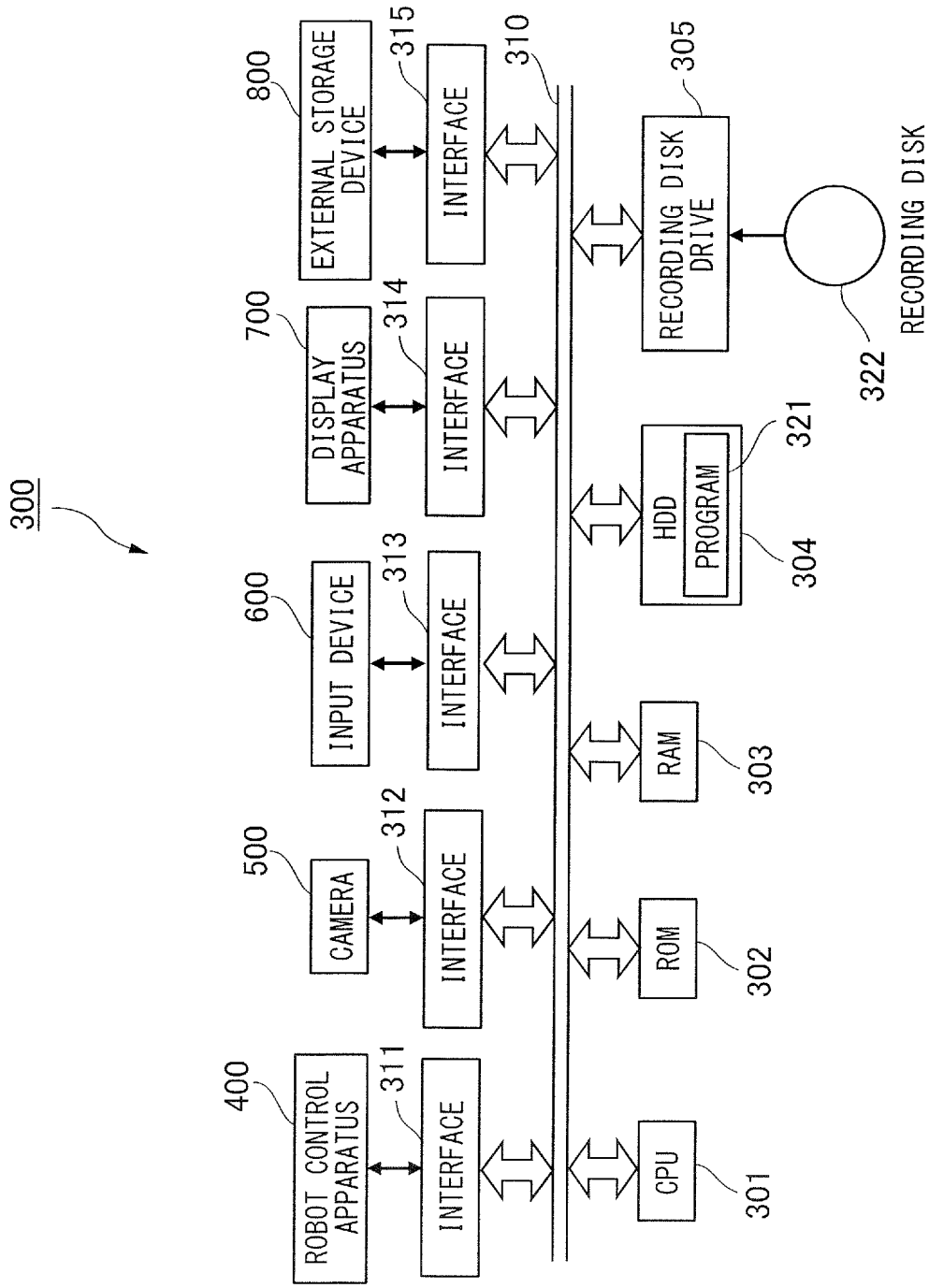
FIG. 3 is a block diagram illustrating a configuration of an image processing apparatus according to the exemplary embodiment.

FIG. 3 illustrates an example of a configuration of the image processing apparatus 300 of the present exemplary embodiment. The image processing apparatus 300 of FIG. 3 performs image processing, specifically pattern matching processing, and can be constituted by, for example, using an architecture such as a personal computer: PC. The image processing apparatus 300 includes a central processing unit: CPU 301 as a calculation portion serving as a controller. In addition, the image processing apparatus 300 includes a read-only memory: ROM 302, a random access memory: RAM 303, and a hard disk drive: HDD 304 as storage portions. Further, the image processing apparatus 300 includes a recording disk drive 305 and various interfaces 311 to 315.

The CPU 301 is connected to the ROM 302, the RAM 303, the HDD 304, the recording disk drive 305, and the interfaces 311 to 315 via a bus 310.

The ROM 302 stores a booting program such as a basic input/output system: BIOS. The RAM 303 is a storage device that temporarily stores various data such as results of arithmetic processing. The HDD 304 stores, or records, a program 321. Each step of an image processing method that will be described later is executed by the CPU 301 reading out and executing the program 321. The recording disk drive 305 is capable of reading out various data, programs, and the like that are recorded in a recording disk 322. The recording disk 322 may be a semiconductor memory device or the like in addition to various magnetic disks and optical disks. In the case where the recording disk 322 stores an image processing program describing a control procedure of the present invention, the recording disk 322 constitutes a non-transitory computer-readable recording medium of the present invention.

The interface 311 is connected to the robot control apparatus 400. The CPU 301 transmits an image processing result to the robot control apparatus 400 via the bus 310 and the interface 311. The robot arm 402 controlled by the robot control apparatus 400 constitutes a manufacturing apparatus that performs a manufacturing process on the workpieces W1 and W2 by using a result of the pattern matching performed by the image processing apparatus 300. The pattern matching performed by the image processing apparatus 300 is used for, for example, control of the manufacturing process performed by the robot arm 402 that assembles the workpieces W1 and W2 by recognizing the relative positions and orientations of the workpieces W1 and W2. Alternatively, the pattern matching performed by the image processing apparatus 300 may be performed for, for example, inspection of individuals of the workpieces W1 and W2 or an assembly in which the workpieces W1 and W2 are integrated. In this case, the manufacturing process performed by the robot arm 402 can be controlled in accordance with a result of the inspection. For example, change in the conveyance destination of the workpieces or the assembly can be controlled. The image processing using pattern matching performed by the image processing apparatus 300 can be used in various forms for the manufacturing process control as described above in a manufacturing system, that is, a manufacturing line of the product.

The interface 312 is connected to the camera 500. The CPU 301 transmits a control signal such as a trigger signal to the camera 500 via the bus 310 and the interface 312. The CPU 301 obtains an image signal from the camera 500 via the bus 310 and the interface 312. The obtained image data is stored in a storage device such as the HDD 304 or an external storage device 800 on the basis of control by the CPU 301.

The interface 313 is connected to an input device 600 such as a mouse and a keyboard that transmit an instruction corresponding to operation performed by an operator to the CPU 301. The interface 314 is connected to a display apparatus 700 such as a display that displays an image. The interface 315 is connected to the external storage device 800 such as a rewritable nonvolatile memory such as a universal serial bus: USB memory or an external HDD.

A flow of model generation and image processing using pattern matching performed by the image processing apparatus 300 will be described below. The CPU 301 of the image processing apparatus 300 reads out the program 321 from the HDD 304 and executes the program 321 to perform each step of the following image processing method.

Figure 4:
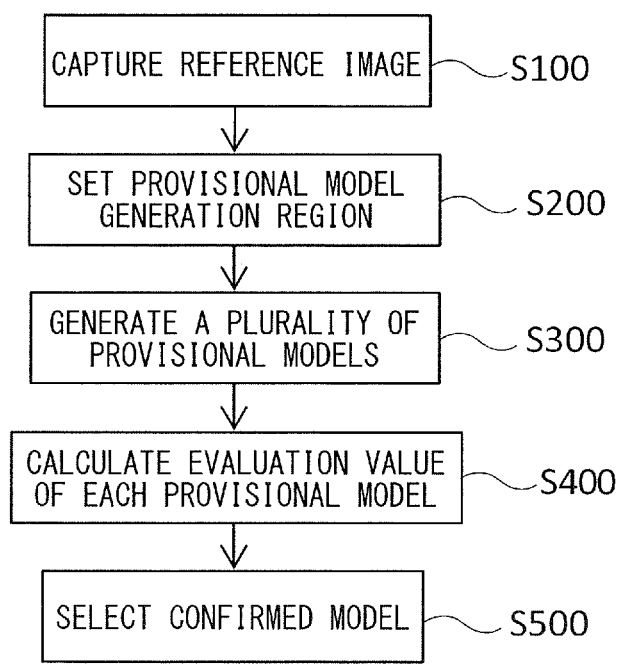
FIG. 4 is a flowchart illustrating a process of generating a pattern matching model according to a first exemplary embodiment of the present invention.

FIG. 4 shows an overview of the model generation processing. In FIG. 4, an operator that is a user of this system sets a workpiece serving as a detection target in the same lighting conditions and at the same position as in actual manufacture of the product in the manufacturing line, to prepare a reference image for generating a model for pattern matching. In step S100, the CPU 301 causes the camera 500 to capture an image of the workpiece, and obtains image data serving as a reference image in which the workpiece is captured from the camera 500.

To be noted, this reference image may be stored in advance in a storage device such as the HDD 304 or the external storage device 800, and in this case, the CPU 301 obtains the data of reference image from the storage device such as the HDD 304 or the external storage device 800. The reference image is captured in the same conditions as in actual image capturing in a monitoring process in the manufacturing line.

In step S200, the CPU 301 causes the display apparatus 700 to display the reference image, and sets a rectangular region designated by the operator and including a portion where a reference object that is the workpiece is captured or a portion including a characteristic part of the reference object as a provisional model generation region. When setting this provisional model generation region, the operator can use, for example, a user interface utilizing the input device 600 such as a mouse. The setting of the provisional model generation region is performed by an operation by a user such as clicking two points of an upper left point and a lower right point of a region including an image in which the reference object in the reference image displayed on the display apparatus 700 is captured.

The CPU 301 sets, as a region for which a provisional model is to be generated, a rectangular region based on the positions of the two points that have been clicked, that is, the upper left corner point and the lower right corner point of the rectangular region, in step S200. The position and shape of the set provisional model generation region is stored in the RAM 303 or the HDD 304. To be noted, although a setting method of a rectangular region has been described above, the set region is not limited to a rectangular region, and a circular region may be set by clicking three points, or an arbitrary region defined by connecting clicked points may be set.

Figure 5:
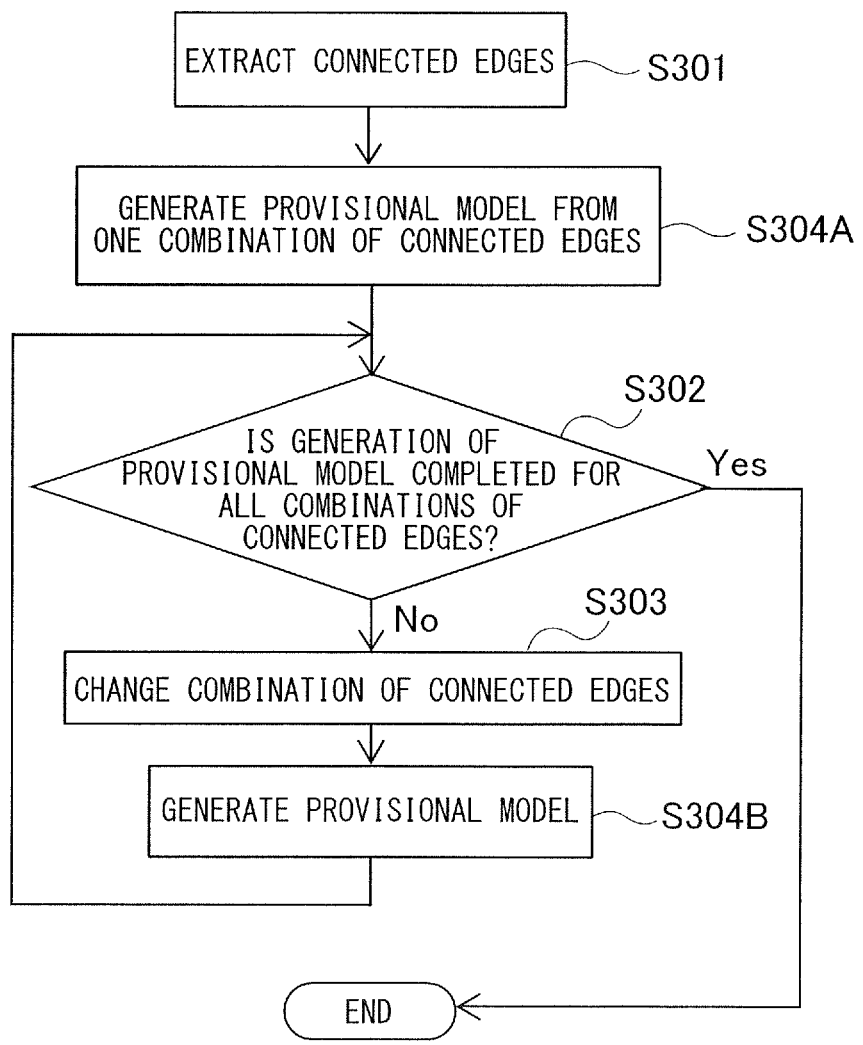
FIG. 5 is a flowchart illustrating a process of generating a provisional model according to the first exemplary embodiment of the present invention.

Next, a method of generating a provisional model will be described. FIG. 5 shows details of an example of processing in a provisional model generation step corresponding to step S300 of FIG. 4. For example, the CPU 301 that executes the provisional model generation step constitutes a functional block as a provisional model generation portion in the image processing apparatus 300. In step S301 of FIG. 5, the CPU 301 performs processing of extracting a connected edge in which edge points are connected for the region set in step S200 in the reference image obtained in step S100. The details of this connected edge extraction processing serving as step S301 will be described below.

The CPU 301 calculates an edge intensity and an edge direction for each pixel in a reference image region serving as a connected edge extraction target. The edge intensity represents a degree of contrast, that is, a degree of steepness of change in brightness, and the edge intensity is larger when the contrast between a pixel of interest and a pixel adjacent thereto is larger. The edge direction represents the direction of the contrast, and indicates a direction or angle in which the edge intensity of the pixel of interest is the largest. For calculation of the edge intensity, for example, a sobel filter for an x-axis direction that is the horizontal axis direction of the image and a sobel filter for a y-axis direction that is the vertical axis direction of the image are used.

Figure 6:
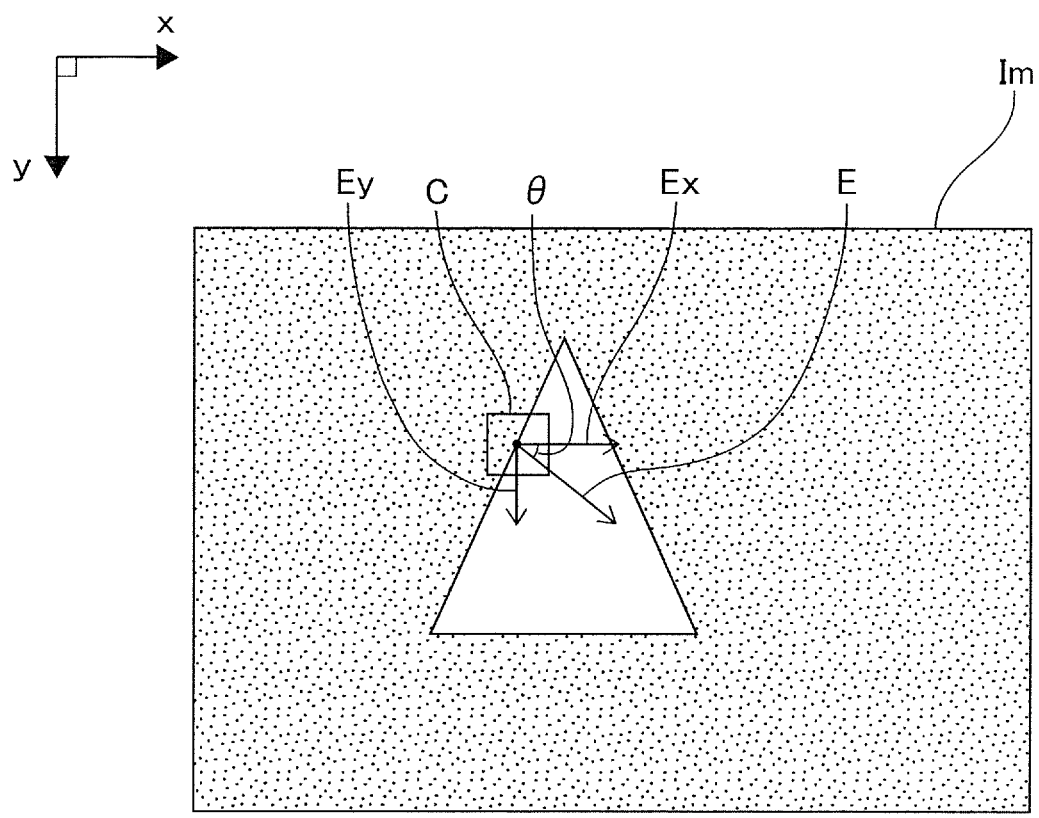
FIG. 6 is an explanatory diagram illustrating edge extraction processing according to the first exemplary embodiment of the present invention.

FIG. 6 illustrates an operation of performing processing of extracting the edge intensity and the edge direction on a reference image region Im. In this extraction processing, first, the CPU 301 calculates an edge intensity Ex in the x-axis direction and an edge intensity Ey in the y-axis direction in a pixel of interest C in the reference image region Im of FIG. 6. A vector of these edge intensities is represented by (Ex, Ey).

Then, the CPU 301 calculates an edge intensity E of the pixel of interest C as a square root of sum of squares of the intensities Ex and Ey of the respective axes, for example, as expressed by the following formula (1).

$$E = \sqrt{E_x^2 + E_y^2} \tag{1}$$

In addition, the CPU 301 calculates an edge direction θ by the following formula (2).

$$\theta = \operatorname{atan}\left(\frac{E_y}{E_x}\right) \tag{2}$$

Then, the CPU 301 calculates the edge intensity and the edge direction for all pixels of the reference image region Im by the method described above. Further, the CPU 301 extracts pixels whose edge intensity is equal to or larger than a certain threshold value as edge features, or edge points, and generates an edge feature image that is a set of a plurality of edge points.

Figure 7:
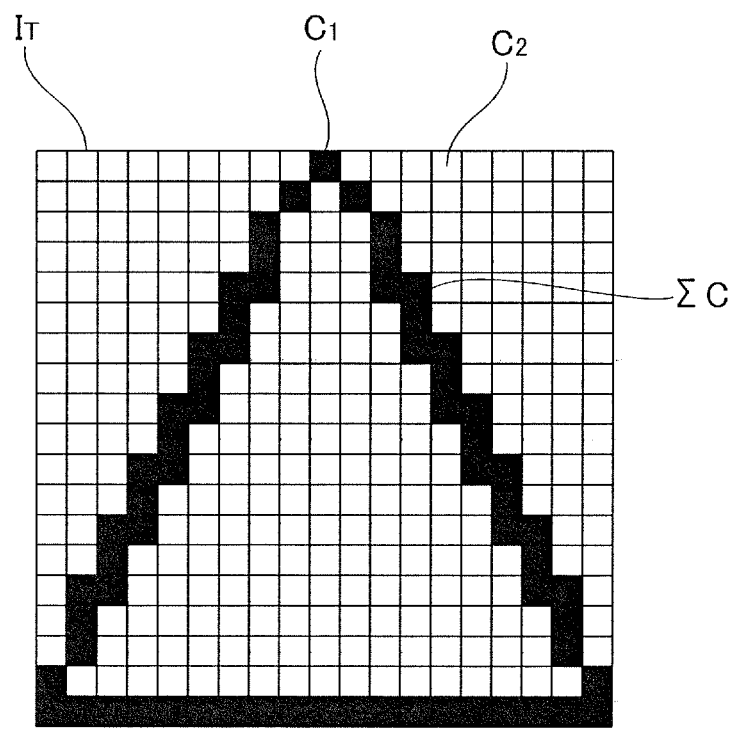
FIG. 7 is an explanatory diagram illustrating a feature image according to the first exemplary embodiment of the present invention.

FIG. 7 illustrates an example of an edge feature image $I_T$. In the edge feature image $I_T$ of FIG. 7, pixels indicating an edge feature that the edge intensity is equal to or larger than the certain threshold value are indicated by black as edge points, and pixels whose edge intensity is smaller than the threshold value are indicated by white as non-edge points.

As a data holding method of the feature image $I_T$, for example, a two-channel data region is secured in a storage region of the RAM 303 or the like for each pixel of the image. Then, for example, in the case of a pixel C1 extracted as an edge point as illustrated in FIG. 7, information of the edge intensity is stored in the first channel, and information of the edge direction is stored in the second channel. In addition, for a pixel C2 determined as a non-edge point, a value indicating that an edge feature is not exhibited, for example, 0, is stored. A set ΣC of pixels C1 representing edge points serves as the feature image $I_T$.

To be noted, two images constituted by an edge intensity image in which only the edge intensity is stored and an edge direction image in which only the edge direction is stored may be used as a pair of feature images. In addition, although sobel filters are used for calculation of the edge intensity in the present exemplary embodiment, another generally known edge extraction filter such as a Canny filter may be used.

Next, connected edges in which edge points are connected is extracted, and each connected edge is labeled. Search is performed on pixels adjacent to pixels extracted as edge points in the edge extraction processing described above in four directions or eight directions including diagonal directions, and pixels that are edge points adjacent to each other are stored as connection components of the same connected edge. As a result of this, a connected edge in which individual connection components are labeled as one set can be extracted. In the case where portions indicated by lines in an image 8000 illustrated as an example in FIG. 8 are connected edges, five connected edges 801 to 805 are extracted.

Figure 9:
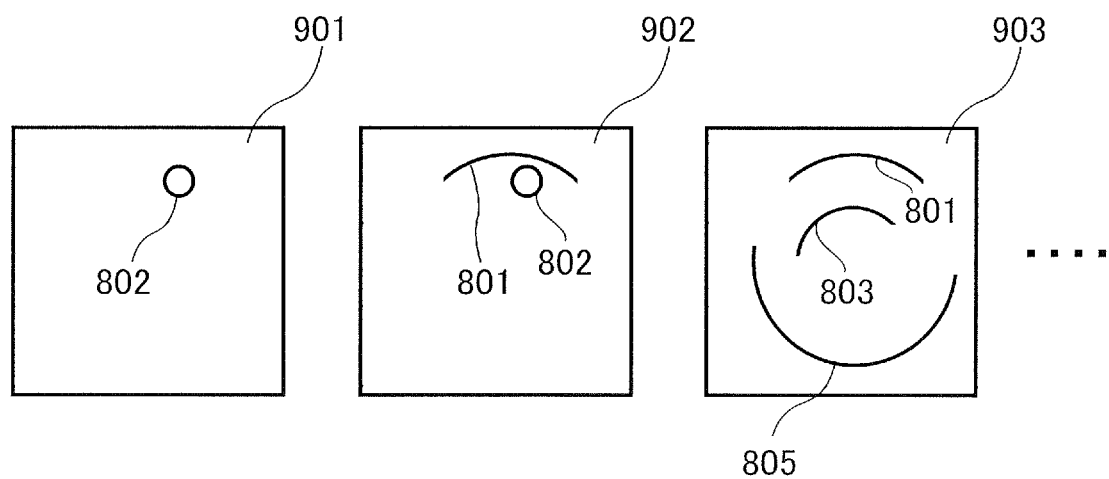
FIG. 9A illustrates an example of a provisional model including a connected edge.
FIG. 9B illustrates an example of another provisional model including a combination of connected edges.
FIG. 9C illustrates an example of yet another provisional model including a different combination of connected edges.

Then, in step S304A of FIG. 5, a provisional model is generated for one combination of connected edges. Then, by repeating a loop of steps S302 to S304B, provisional models are generated for all combinations of connected edges. That is, provisional models are generated in step S304B while changing the combinations of the connected edges extracted in step S301 as illustrated in FIGS. 9A to 9C in step S303. For example, a provisional model 901 illustrated in FIG. 9A is a provisional model for a combination including only the connected edge 802 among the five connected edges. A provisional model 902 illustrated in FIG. 9B is a provisional model of a combination including the connected edges 801 and 802. A provisional model 903 illustrated in FIG. 9C is a provisional model of a combination including the connected edges 801, 803, and 805.

Figure 8:
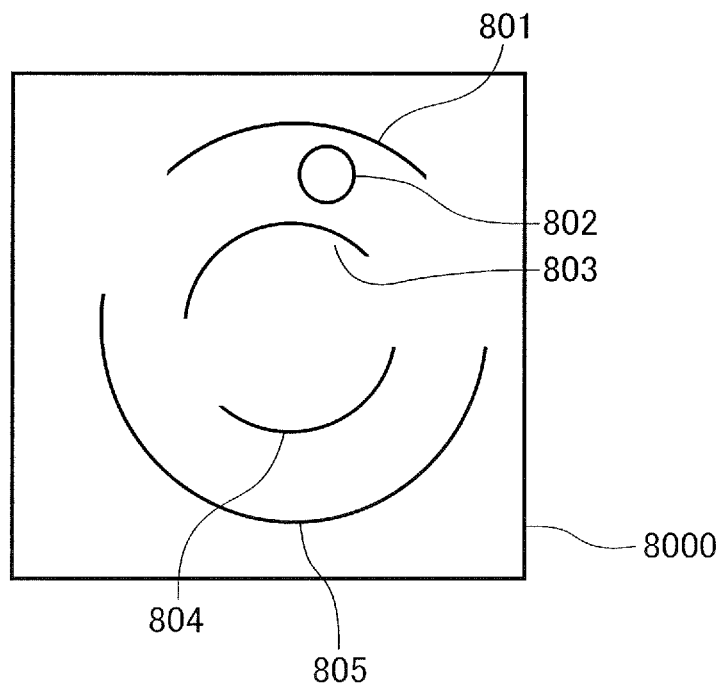
FIG. 8 is an explanatory diagram illustrating extraction of a connected edge according to the first exemplary embodiment of the present invention.

For example, in the case where five connected edges are extracted as illustrated in FIG. 8, provisional models for pattern matching are generated for all combinations of the five connected edges, and are stored in the HDD 304 or the like. Whether or not the provisional models have been generated for all combinations of the connected edges is determined in step S302, and this process is finished in the case where the provisional models have been generated for all combinations of the connected edges.

In the case where five connected edges are extracted, a provisional model can be generated by selecting all the five connected edges, or generated by selecting only one connected edge. In the case of five connected edges, the number of combinations of the connected edges can be calculated by the following formula (3), and is 31. That is, in the case where five connected edges are extracted, 31 provisional models are generated.

$$_5C_5 + {_5C_4} + {_5C_3} + {_5C_2} + {_5C_1} = 31 \quad (3)$$

$$_nC_r = \frac{n!}{r!(n-r)!}$$

Figure 10:
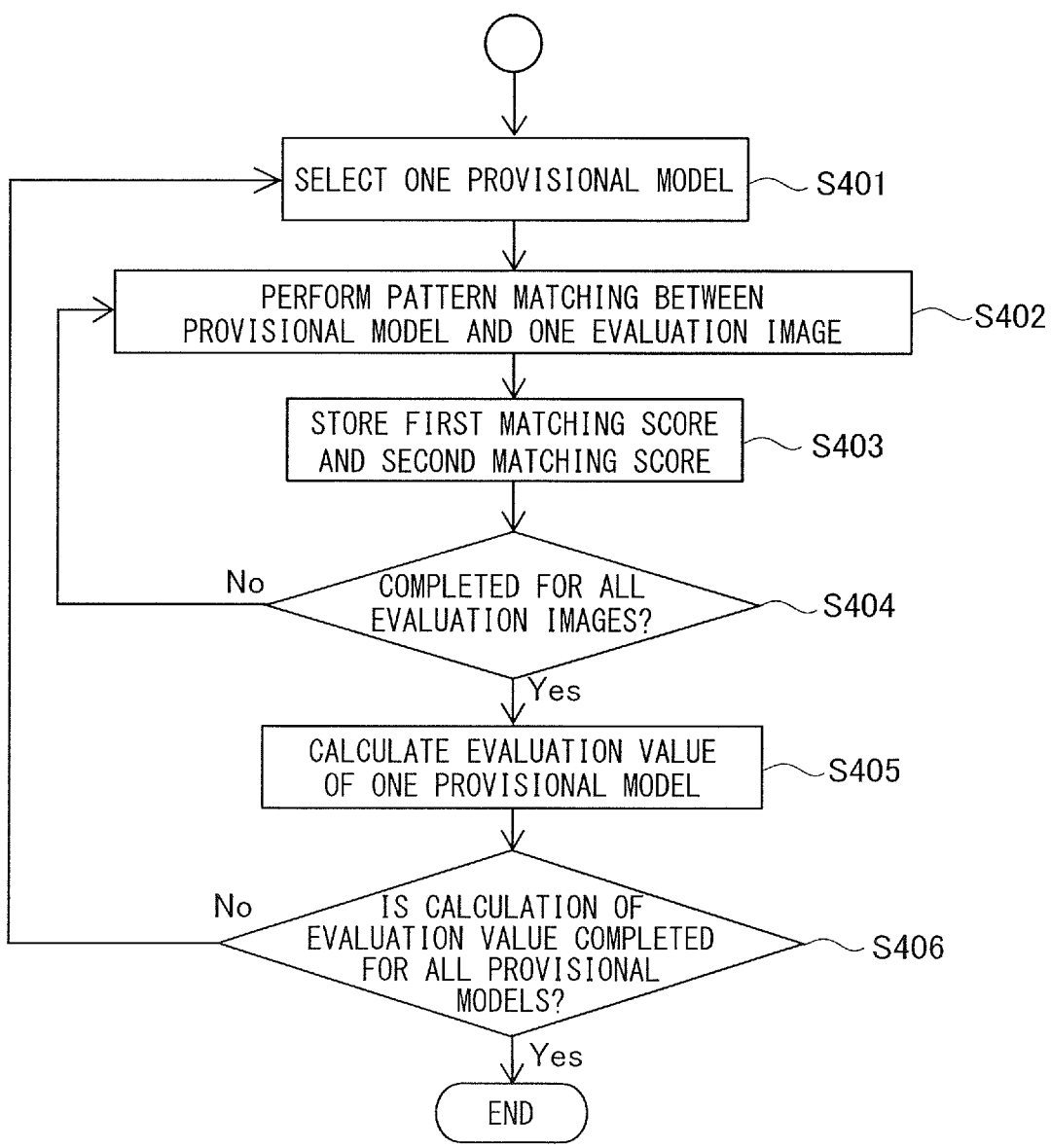
FIG. 10 is a flowchart illustrating a process of calculating an evaluation value of a provisional model according to the first exemplary embodiment of the present invention.

Next, an evaluation value calculation step of calculating an evaluation value for each of the plurality of provisional models generated as described above is performed. This step corresponds to step S400 of FIG. 4. As illustrated in FIG. 10, this evaluation value calculation step S400 is performed by performing processing of selecting one of the plurality of provisional models and calculating an evaluation value of the selected provisional model sequentially on all the provisional models. To be noted, the CPU 301 that executes this evaluation value calculation step constitutes, for example, a functional block as an evaluation portion in the image processing apparatus 300.

In Step S401 of FIG. 10, one provisional model is selected from the plurality of generated provisional models. Pattern matching is performed between the selected provisional model and one of a plurality of evaluation images that are prepared in advance. The evaluation images are images obtained by actually imaging a detection target such as a workpiece, and images captured in the same system as the manufacturing apparatus 200 in an experiment, actual images stored during manufacture, or the like are used as the evaluation images.

Figure 11:
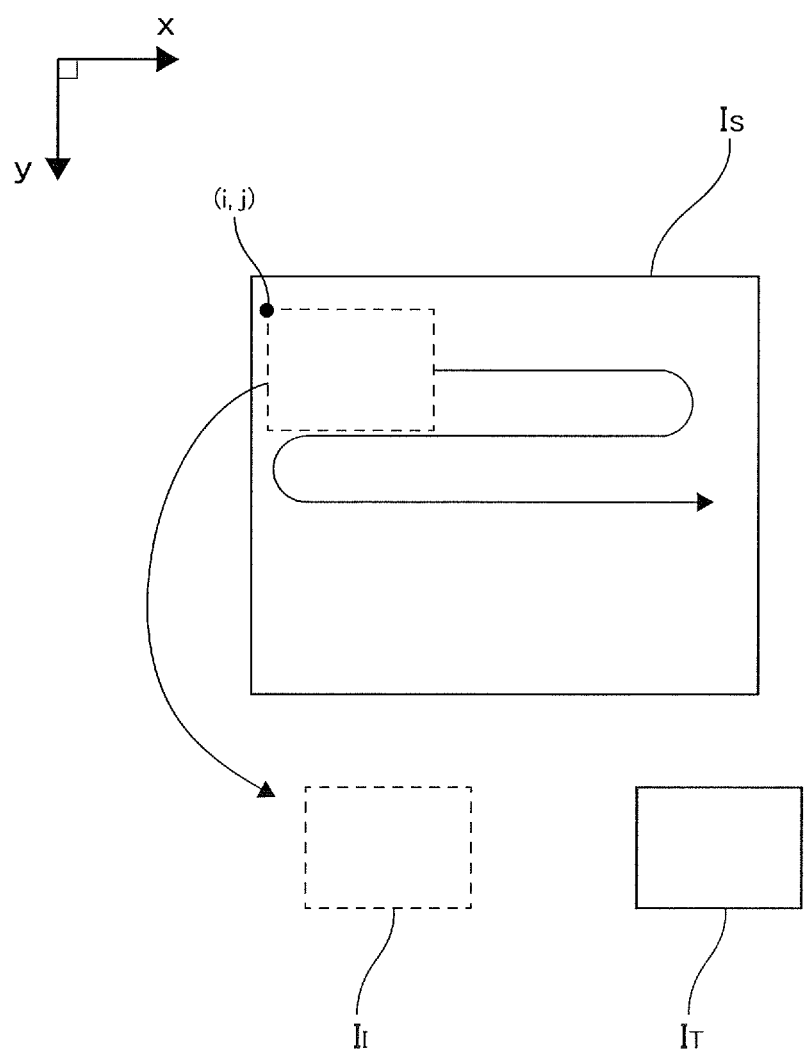
FIG. 11 is an explanatory diagram illustrating pattern matching processing in image processing according to the first exemplary embodiment of the present invention.

That is, in step S402, the CPU 301 loads one of the plurality of evaluation images stored in the HDD 304, and performs pattern matching by using the selected one provisional model. For example, the pattern matching is performed as follows. First, edge extraction is performed on the evaluation image, and thus an evaluation edge image Is is generated. The method of edge extraction processing is the same as in the edge extraction processing on the reference image described above. As illustrated in FIG. 11, an extraction window of the same size as a currently selected provisional model is placed in the evaluation edge image Is, and an image $I_I$ of a size corresponding to the provisional model is extracted from the evaluation edge image Is. The extraction window of the same size as the provisional model extracts the image $I_I$ one after another while changing the position thereof pixel by pixel. A matching score R representing the degree of similarity between the image $I_I$ extracted in this manner and the provisional model is obtained by the following formula (4). To be noted, in the description below, the matching score representing the degree of similarity may be also simply referred to as a "score" for the sake of simplicity.

$$R_{ij} = \frac{1}{n}\sum_{k=1}^{n}\cos|\theta_{Ik} - \theta_{Tk}| \quad (4)$$

$R_{ij}$: score at position (i, j) in image
n: number of edge points of model
$\theta_I$: edge direction of evaluation edge image
$\theta_T$: edge direction of model image That is, a local score of one edge point is calculated by obtaining a cosine value of an edge direction difference between one edge pixel of the provisional model and one edge pixel of the extracted evaluation edge image. By performing this processing on all the edge pixels, local scores of all the edge points and the sum thereof can be calculated. By dividing the sum of the local scores by the number of edge points of the provisional model, a value normalized within a range of −1 to 1 can be obtained as a final score.

The position (i, j) in the image in the formula (4) described above corresponds to a position indicated by (i, j) in FIG. 11, that is, a position in the evaluation edge image where an image of a size corresponding to the provisional model is extracted from the evaluation edge image. The score R is calculated while moving the extraction window in the range of all possible translational movement. The score is represented by a value from −1 to 1, 1 corresponds to the highest degree of similarity, and −1 corresponds to the lowest degree of similarity.

To be noted, the calculation method for the score for evaluating the provisional model can be arbitrarily selected, and a score calculation method different from one described above may be used. For example, the matching score may be calculated from the x-direction edge intensities and y-direction edge intensities of the model and the evaluation edge image by the following formula (5).

$$R_{ij} = \frac{1}{n}\sum_{k=1}^{n} \frac{Ex_{Ik} Ex_{Tk} + Ey_{Ik} Ey_{Tk}}{E_{Ik} E_{Tk}} \quad (5)$$

$R_{ij}$: degree of similarity at position (i, j) in image
n: number of edge points
$E_I$: edge intensity of search target image
$E_T$: edge intensity of model image
$Ex_I$: edge intensity in x direction of search target image
$Ex_T$: edge intensity in x direction of model image
$Ey_I$: edge intensity in y direction of search target image
$Ey_T$: edge intensity in y direction of model image When score calculation is finished for all search positions in the evaluation edge image, the pattern matching using the provisional model is finished. When score calculation in all search positions is not completed, the extraction window is moved on to the next search position (i, j), and calculation of the matching score is continued. Although a pattern matching method with which only translational movement of the model is detected has been described in the present exemplary embodiment for the sake of simplicity, a similar method can be also applied to pattern matching that detects rotation, scale change, or the like.

Figure 12:
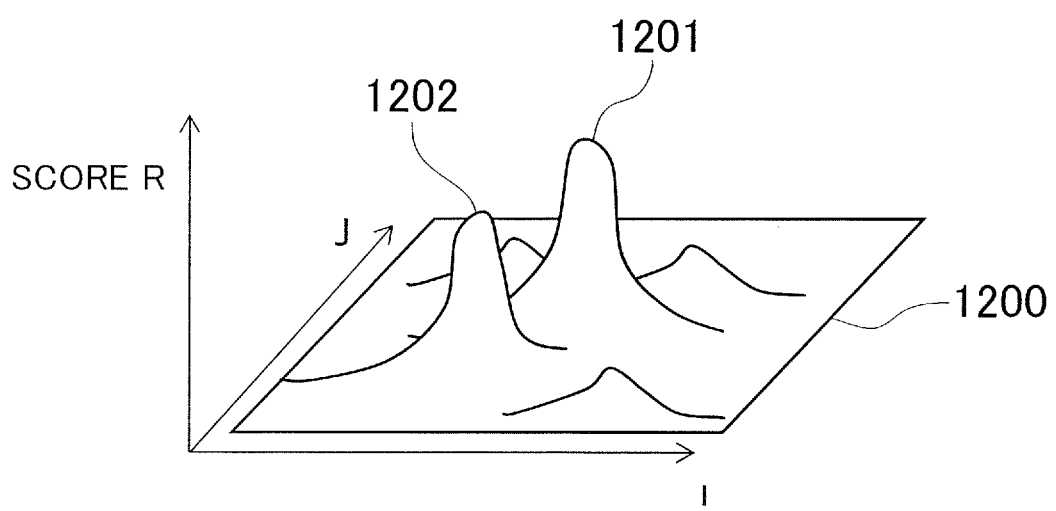
FIG. 12 is an explanatory diagram illustrating a score map in evaluation value calculation according to the first exemplary embodiment of the present invention.

In the case where a matching score of a predetermined threshold value or more is calculated when performing the pattern matching, the score R and the position (i, j) where the score R is calculated are stored in the RAM 303. In this manner, as illustrated in FIG. 12, a score map of an evaluation image is generated. When the predetermined score threshold value is set to −1, a score map including scores of all the positions in the evaluation image is generated.

Further, in step S403 of FIG. 10, the CPU 301 extracts, from the score map temporarily stored in the RAM 303, the maximum detected score serving as a first highest detected score and a second highest detected score obtained at a second position separated from a first position where the maximum detected score is obtained. These scores that have been extracted are stored in a storage portion such as the RAM 303. An extraction method of the two scores will be described in detail below.

The maximum detected score serving as a first highest detected score is the maximum value of the score R of the score map as indicated by the apex of a peak 1201 in FIG. 12. That is, this maximum detected score is a first matching score whose degree of similarity obtained for the evaluation image is the highest.

In addition, a second matching score obtained at a position different from the spatial position where the first matching score is obtained in the evaluation image is obtained. For example, as illustrated in FIG. 12, this second matching score is a detected score of the apex of a peak 1202 that is second highest and different from the peak 1201 including the apex where the maximum detected score is detected. The maximum detected score is the highest local maximum, and the second matching score may be referred to as a second highest local maximum. To be noted, in the case where only one local maximum appears in the score map, the minimum value in the score map is set as the second matching score. In the case where the error of matching accuracy, the error of noises, the error of individual differences, or the like is large, the matching score of the same position is sometimes displaced and appears at a plurality of positions. In this case, it is preferable that the highest matching score at a position separated from the first position of the maximum detected score 1201 by a threshold value serving as a predetermined distance or more is set as the second matching score. The threshold value of the separation distance between the first position and the second position may be preset by calculating a value based on the error of matching accuracy, the error of noises, the error of individual differences, or the like, or may be arbitrarily set by the user. For example, in the case where a range within 10 pixels in the X direction and in the Y direction from the position of the maximum detected score 1201 in the image is defined as a range of the vicinity of the maximum detected score, the highest score in a range spatially separated more than ten pixels from the position of the maximum detected score 1201 may be extracted as the second matching score.

Figure 13:
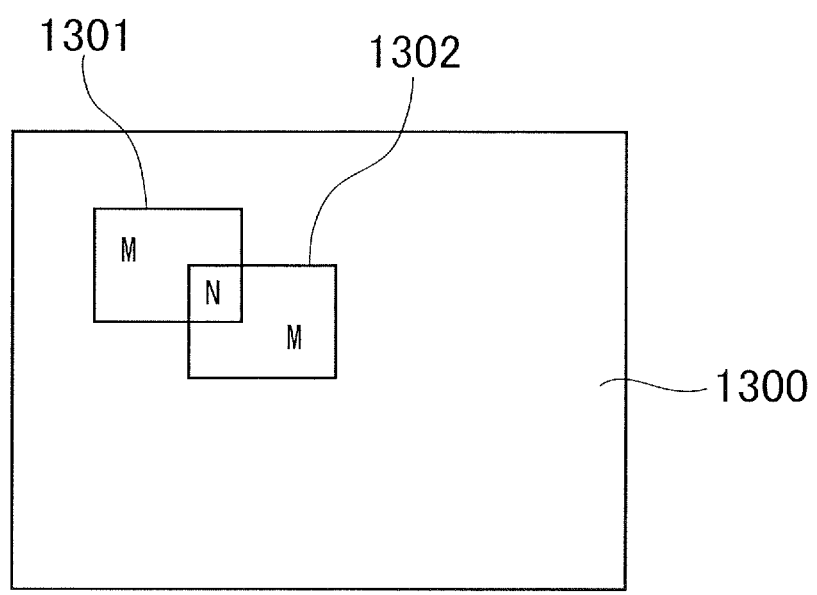
FIG. 13 is an explanatory diagram illustrating an example of a process of determining whether or not a score corresponds to a position near a position of the maximum detected score in the evaluation value calculation according to the first exemplary embodiment of the present invention.

It is not necessarily required that the predetermined distance is larger than a predetermined number of pixels from the position of the maximum detected score. For example, as illustrated in FIG. 13, whether a position 1302 of the second highest score corresponds to a range excluding the vicinity of a position 1301 of the maximum detected score may be determined on the basis of degree of overlap between two image regions of the provisional model by positioning the provisional model in the position 1301 and the position 1302. The degree of overlap between the two image regions, that is, the range of overlap, is calculated by, for example, N/M, where M represents the area of the provisional model and N represents the area of a portion where the two image regions overlap. It is determined that the position of the second highest score is separated from the position of the maximum detected score by the predetermined distance or more in the case where this degree or range of overlap is equal to or smaller than a predetermined overlap range, for example, a predetermined threshold value. In the case where the predetermined threshold value of the degree of overlap is set to 0.5, it is determined that the two positions are closer than the threshold value when the provisional model positioned in the position of the maximum detected score and the provisional model positioned in another position overlap by 50% or more. In the case where the overlap is smaller than 50%, it is determined that the other position is separated from the position of the maximum detected score by the threshold value or more, and the score obtained at this position is employed as the second matching score.

As described above, regarding the matching score corresponding to the degree of similarity between images, the first highest matching score and the second highest matching score can be obtained from one evaluation image and one provisional model. The obtained first highest matching score and the second highest matching score obtained at a position separated from the position where the first highest matching score is obtained are stored in the RAM 303.

Then, while checking whether or not the same processing has been performed on all the prepared evaluation images in step S404, the steps S402 and S403 described above are performed. A first matching score group that is a set of the obtained first highest matching scores and a second matching score group that is a set of the second highest matching scores are stored in the RAM 303. When it is confirmed that the processing has been performed on all the evaluation images in step S404, the process proceeds to step S405. As described above, for one provisional model, a first matching score group and a second matching score group can be obtained by using a plurality of evaluation images.

When the processing on all the evaluation images is completed for one provisional model, a table of the first matching score group and the second matching score group serving as table data can be obtained for the one provisional model. For example, as illustrated in FIG. 14, a table of the first and second matching score groups serving as table data extracted for each evaluation image is obtained on the RAM 303. FIG. 14 illustrates a case where the number of evaluation images is 5, and columns 1401, 1402, and 1403 respectively correspond to an identification number of the evaluation image, the first highest matching score serving as the maximum detected score of the evaluation image, and the second highest matching score obtained at a position separated from the position of the maximum detected score by a predetermined distance or more.

In step S405 of FIG. 10, the CPU 301 calculates an evaluation value of a specific provisional model selected in step S401 in the following manner. For example, the evaluation value of this provisional model is calculated on the basis of the score table of FIG. 14 serving as table data generated by the processing of steps up to step S404.

Figure 15:
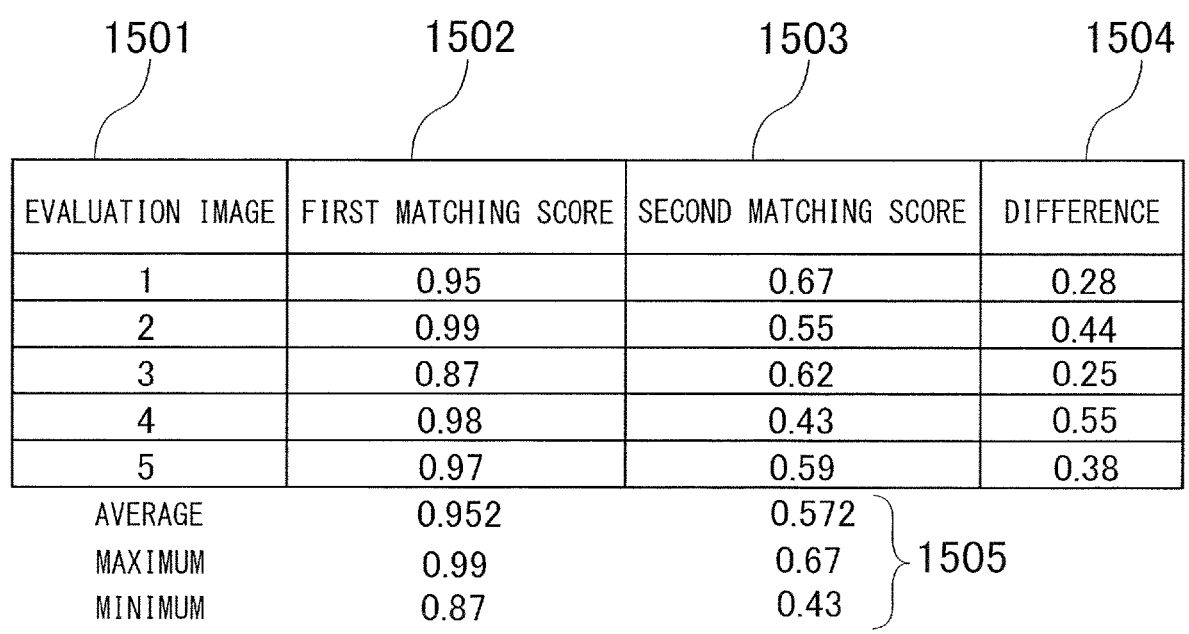
FIG. 15 is a table for describing the evaluation value calculation method according to the first exemplary embodiment of the present invention.

FIG. 15 illustrates a calculation result of evaluation value of the one provisional model. In FIG. 15, columns 1501, 1502, and 1503 respectively correspond to an identification number of the evaluation image, the maximum detected score of the evaluation image, and the second highest score obtained at a position separated from, that is, not close to the position of the maximum detected score. In addition, a column 1504 corresponds to the difference between the maximum detected score and the second highest score, and a field 1505 shows the average values, maximum values, and minimum values of the maximum detected scores and the second highest scores of the evaluation images.

In the present exemplary embodiment, for example, as an evaluation value of a provisional model, the minimum value of differences between maximum detected scores and second highest scores obtained at positions separated from, that is, not close to positions where the maximum detected scores are obtained is employed. For example, in the example of the provisional model whose calculation result of evaluation value is shown in FIG. 15, the difference shown in the column 1504 is the smallest for the third evaluation image, and the evaluation value of this provisional model is 0.25.

To be noted, other calculation methods can be considered for the evaluation value of the provisional model. One example of the calculation method of the evaluation value is a method of calculating the average value of maximum detected scores of images and the average value of the second highest scores obtained not in the vicinity of the positions of the maximum detected scores of the images, and setting the difference between the average values as the evaluation value. According to this method, in the case of the provisional model whose calculation result of the evaluation value is shown in FIG. 15, 0.38, which is the difference between the two average values 0.952 and 0.572 as shown in the field 1505 is set as the evaluation value of this provisional model.

Another example of the calculation method of the evaluation value is a method of calculating the minimum value of maximum detected scores of images and the maximum value of the second highest scores obtained not in the vicinity of the positions of the maximum detected scores of the images, and setting the difference between the minimum value and the maximum value as the evaluation value. According to this method, in the case of the provisional model whose calculation result of the evaluation value is shown in FIG. 15, the evaluation value is 0.2, which is the difference between 0.87 and 0.67 as shown in the field 1505. As the calculation method of the evaluation value of the provisional model, a method different from the methods described above may be appropriately employed by one skilled in the art. For example, one evaluation value is appropriately calculated for one provisional model by using the values of the table of FIG. 15.

Further, the CPU 301 performs the processing of steps S401 to S405 of FIG. 10 on all the prepared provisional models. Then, when it is determined that the calculation of evaluation value has been completed for all the provisional models in step S406, the evaluation value calculation processing of the provisional models corresponding to step S400 of FIG. 4 and shown in detail in FIG. 10 is completed.

Finally, in step S500 of FIG. 4, the CPU 301 selects, from the provisional models generated in step S400, a provisional model for which the largest evaluation value is obtained, and determines the selected provisional model as a confirmed model to be used for pattern matching during manufacture. This confirmed model that has been determined is stored in a storage portion such as the HDD 304 such that the confirmed model can be used in actual pattern matching. To be noted, the CPU 301 that executes this determination step S500 of FIG. 4 constitutes, for example, a functional block as a determination portion in the image processing apparatus 300.

Automatic generation processing of a model is finished as described above. The CPU 301 performs pattern matching between the confirmed model generated in the steps described above and the image captured by the camera 500, and thus the actual manufacturing apparatus 200 operates.

As described above, to determine a model for pattern matching with which erroneous detection is less likely to occur, according to the present exemplary embodiment, a plurality of provisional models are generated, pattern matching is performed on evaluation images, and a provisional model having the highest evaluation value among the provisional models is employed as a confirmed model serving as an official model. For example, the difference between the maximum detected score and the second matching score detected at a position not close to the position where the maximum detected score is detected when pattern matching is performed on the evaluation images is employed as the evaluation value. That is, a position where erroneous detection is the most likely to occur is, in the example of the score map of FIG. 12, the position of a peak formed at a position different from the position of the peak 1201 where the score R is the highest, such as the peak 1202, and this is employed as the second matching score of a position not close to the position of the maximum detected score. A matching model in which the difference between the second matching score 1202 having a high possibility of causing erroneous detection and the maximum detected score 1201 of a correct detection position is larger has a lower possibility of erroneous detection.

Further, according to the present exemplary embodiment, a model in which the difference between these two scores is as large as possible can be automatically selected from a plurality of provisional models. In addition, according to the present exemplary embodiment, since the evaluation and selection of the model can be performed in advance before starting manufacture, pattern matching can be performed with one model that is selected in advance, in monitoring or the like in an actual manufacturing process. That is, according to the present exemplary embodiment, pattern matching does not have to be performed by using a large number of matching models in image processing performed for monitoring an actual manufacturing line, and therefore monitoring processing based on image processing can be performed at a high speed without increasing the image processing time. In addition, by using the difference between the two scores described above, the present exemplary embodiment can be versatilely applied to even a case where the shape of the score map changes by an influence from the background, noises, shape of the workpiece, and the like in various manufacturing steps. According to the present exemplary embodiment, a model used for pattern matching that suppresses erroneous detection and can be applied to various manufacturing steps without increasing the processing time can be automatically generated.

Second Exemplary Embodiment

In the first exemplary embodiment described above, a method of generating a model used for shape-based or edge-based pattern matching has been described. The method of the present invention can be also applied to model generation for pattern matching of a different method. Automatic generation of a model used for brightness-based pattern matching will be described below in a second exemplary embodiment.

The schematic configuration of the manufacturing apparatus and the configuration of the image processing apparatus of the second exemplary embodiment are similar to the first exemplary embodiment illustrated in FIGS. 2 and 3.

Generation of a model and execution of pattern matching corresponding to an image processing method performed by the image processing apparatus 300 will be described below. The CPU 301 of the image processing apparatus 300 executes each step of an image processing method described below, by reading out and executing the program 321 from the HDD 304.

The overall flow of model generation is similar to the flow of the first exemplary embodiment illustrated in FIG. 4. Particularly, although steps S100 and S200 of FIG. 4 are similar to those of the first exemplary embodiment, generation of the plurality of provisional models corresponding to step S300 of FIG. 4 is performed by processing illustrated in FIG. 16.

Figure 16:
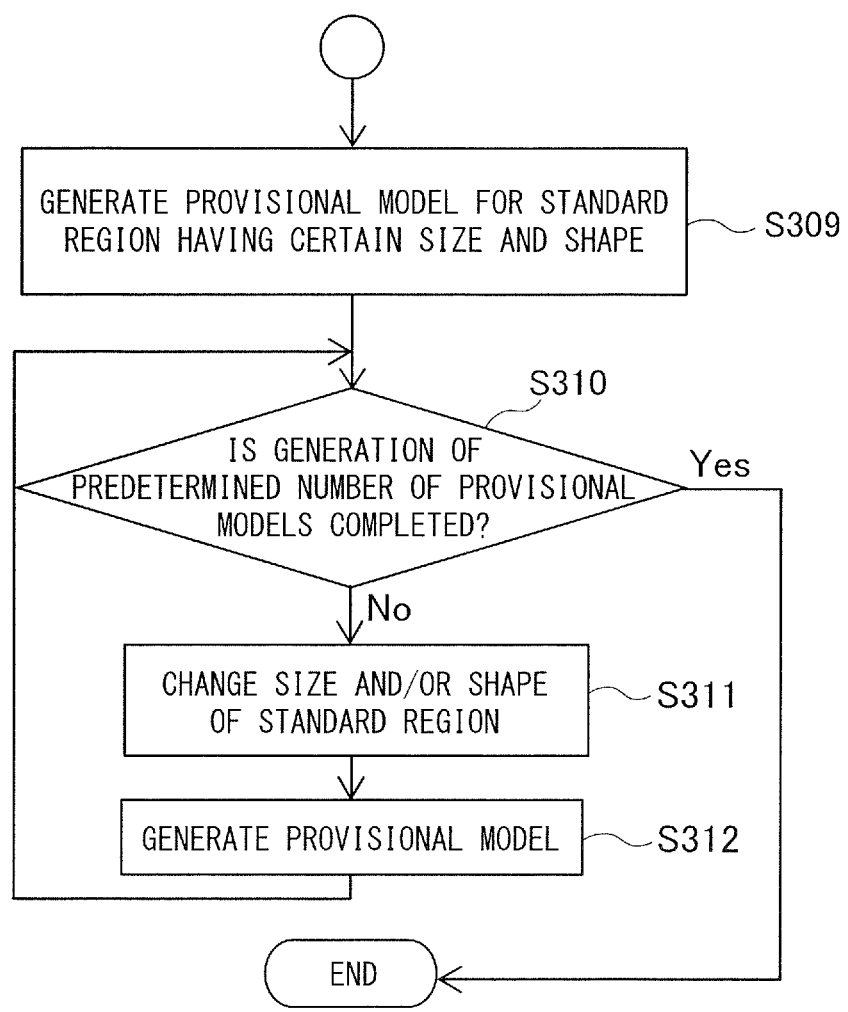
FIG. 16 is a flowchart illustrating provisional model generation processing according to a second exemplary embodiment of the present invention.

In generation of provisional models of FIG. 16, a plurality of provisional models is generated by using a region set in step S200 in a reference image obtained in step S100 of FIG. 4 as a standard region and changing the size and/or shape of the standard region. The overall flow of the processing of FIG. 16 is similar to the flow of the processing of FIG. 5 described above. First, in step S309, a partial image of the standard region having a certain size and shape is cut out from the reference image to generate a provisional model, and the generated provisional model is stored in the HDD 304. Then, steps S311 and S312 are repeatedly executed while determining whether or not generation of the provisional model has completed for all of the standard regions of different shapes and sizes in step S310.

In step S311 of FIG. 16, the definition of the standard region of the provisional model such as the size and/or the shape are/is changed. Here, a standard region whose width and height are changed is generated in the case where the standard region is rectangular, and a standard region whose diameter is changed is generated in the case where the standard region is circular. In addition, the shape of the standard region can be changed in various ways such as change to a rectangular shape or a circular shape by using the center of the standard region as a standard position. In step S311, a region is generated by changing at least one property of the standard region as described above.

In step S312, a partial image corresponding to the region generated in step S311 is cut out from the reference image, and is stored in the HDD 304 as a provisional model for pattern matching. In step S310, whether or not a predetermined number of provisional models have been generated by changing the standard region and generating a provisional model based on the changed standard region is determined, and the provisional model generation processing is finished in the case where the result of this step is positive. In the case where the result of step S310 is negative, the process proceeds to step S311, and the processing described above is repeated.

In the description below, for example, it is assumed that the standard region is set as a rectangular region, and nine provisional models in total are generated by using three variations of change in each of the width and height of the set standard region.

In the present exemplary embodiment, the overall flow of the evaluation value calculation of the provisional model is approximately the same as in FIG. 10 described above. In step S401 of FIG. 10, one provisional model is selected from the plurality of generated provisional models. Then, in step S402, pattern matching is performed on an evaluation image that is prepared in advance similarly to the first exemplary embodiment. This processing is different from the first exemplary embodiment, and brightness-based pattern matching processing as described below is performed.

For example, as illustrated in FIG. 11, partial images of a size corresponding to the provisional model are extracted from the evaluation image while moving an extraction window of the same size as the provisional model pixel by pixel in the evaluation image. Then, the score R between the extracted partial image and the provisional model is obtained by the following formula (6).

$$R_{ij} = \frac{\sum (f_{ij} - \bar{f}) \times (g_{ij} - \bar{g})}{\sqrt{\sum (f_{ij} - \bar{f})^2} \times \sqrt{\sum (g_{ij} - \bar{g})^2}} \quad (6)$$

(i, j): position in image
f: brightness at position (i, j) in search target image
g: brightness at position (i, j) in template image
$\bar{f}$: average brightness of region in search target image corresponding to template
$\bar{g}$: average brightness of template image In the formula (6) above, the position (i, j) in the image corresponds to a position in the provisional model and in the partial image having a size corresponding to the provisional model and being extracted from the evaluation image. Regarding the value of the score, 1 corresponds to the highest degree of similarity, and −1 corresponds to the lowest degree of similarity. Once the score calculation is completed for all search positions in the evaluation image, the pattern matching is finished. When the score calculation is not completed for all the search positions, the position (i, j) is moved to the next search position, and the score calculation is proceeded.

In the case where a score equal to or higher than a predetermined score threshold value is calculated when performing this pattern matching, the calculated score R and the position (i, j) thereof are stored in the RAM 303. As a result of this, similarly to the first exemplary embodiment, a score map of a certain provisional model corresponding to a certain evaluation image is generated as illustrated in FIG. 12. When the predetermined score threshold value is set to −1, a score map including scores of all the positions in the evaluation image is generated.

After generating the score map as described above, steps S403 to S406 of FIG. 10 are executed similarly to the first exemplary embodiment, and thus the evaluation value can be calculated for all the provisional models. Further, automatic model setting of step S500 of FIG. 4, that is, selecting a confirmed model from the plurality of provisional model, can be performed similarly to the first exemplary embodiment.

As described above, also in the case where the calculation method of pattern matching is different, for example, in the case where brightness-based pattern matching is performed as in the present exemplary embodiment, automatic generation of a model can be performed if the calculation method of the score value is appropriately set. As a matter of course, brightness-based pattern matching performed when generating the model is also performed when actually performing pattern matching with the model generated in the manner described above. In a manufacturing line as illustrated in FIG. 2, the CPU 301 performs pattern matching between the confirmed model generated in the steps described above and the image captured by the camera 500, and thus the actual manufacturing apparatus 200 operates.

According to the present exemplary embodiment, a matching model used for image processing in an actual manufacturing process can be automatically generated by calculation using a score map even in the case where the pattern matching is performed on the brightness basis. Cases where the pattern matching used for the image processing is shape-based, that is, connected edge-based, as in the first exemplary embodiment and where the pattern matching is brightness-based as in the second exemplary embodiment have been described above as examples. However, the model generation technique by calculation using the score map of the present invention can be implemented in model generation of various kinds of pattern matching regardless of the processing method of the pattern matching as long as a matching score can be calculated by the pattern matching.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-211413, filed Nov. 9, 2018, and Japanese Patent Application No. 2019-185678, filed Oct. 9, 2019, which are hereby incorporated by reference herein in their entirety.

What is claimed is:

1. An image processing method comprising:
a step of preparing a plurality of provisional models for pattern matching which are generated by using a reference image in which a target object of the pattern matching is recorded;
a step of performing the pattern matching between each of the plurality of provisional models and each of a plurality of evaluation images in which the target object of the pattern matching is recorded, thus obtaining a plurality of matching scores between each of the plurality of provisional models and each of the plurality of evaluation images,
wherein the plurality of matching scores includes (i) a first matching score indicating a degree of similarity between one of the plurality of provisional models and one of the plurality of evaluation images at a first spatial position in the one of the plurality of evaluation images, and (ii) a second matching score indicating a lower degree of similarity than the first matching score between the one of the plurality of provisional models and the one of the plurality of evaluation images at a second spatial position in the one of the plurality of evaluation images, the second spatial position being separated from the first spatial position;
a step of obtaining, for each of the plurality of provisional models, a first matching score group that is a set of first matching scores each of which is the first matching score with respect to each of the plurality of evaluation images and a second matching score group that is a set of second matching scores each of which is the second matching score with respect to each of the plurality of evaluation images;

a step of calculating an evaluation value from the first matching score group and the second matching score group for each of the plurality of provisional models; and a step of determining a matching model from among the plurality of provisional models on a basis of the calculated evaluation value.

2. The image processing method according to claim 1, further comprising determining that a score map generated by the pattern matching between one of the provisional models and one of the evaluation images has a plurality of local maximums, and responding to the determination by setting a first highest local maximum of matching score among the plurality of local maximums as the first matching score, and by setting a second highest local maximum of matching score among the plurality of local maximums as the second matching score.

3. The image processing method according to claim 2, further comprising determining that a threshold value is set for a separation distance between a second position where the second matching score is obtained and a first position where the first matching score is obtained, and responding to the determination by setting a second highest local maximum of matching score that is obtained in a region in a distance equal to or larger than the threshold value from the first position as the second matching score.

4. The image processing method according to claim 1, further comprising determining that a score map generated by the pattern matching between one of the provisional models and one of the evaluation images has only one local maximum, and responding to the determination by setting the local maximum as the first matching score, and by setting a minimum value in the score map as the second matching score.

5. The image processing method according to claim 1, wherein the step of preparing comprises a user interface step of receiving a user operation of designating a provisional model generation range for generating the provisional models from the reference image.

6. The image processing method according to claim 1, wherein, in the step of preparing, a plurality of connected edges each of which is defined by connecting edge points are extracted from the reference image, and the plurality of provisional models are generated in accordance with combinations of the plurality of extracted connected edges.

7. The image processing method according to claim 1, wherein, in the step of preparing, the plurality of provisional models is generated in accordance with a plurality of regions having different sizes and/or shapes extracted from the reference image.

8. The image processing method according to claim 1, wherein a difference between the first matching score and the second matching scores is calculated for each of the evaluation images from the first matching score group and the second matching score group, and a maximum value or minimum value of differences between the first matching scores and the second matching scores is calculated as the evaluation value.

9. The image processing method according to claim 1, wherein, in the step of evaluating, a difference between an average value of the first matching score group and an average value of the second matching score group is calculated as the evaluation value.

10. The image processing method according to claim 1, wherein, in the step of obtaining, a highest local maximum of matching score among local maximums smaller than the first matching score in each of the evaluation images is set as the second matching score.

11. The image processing method according to claim 1, further comprising a repeated step of performing a pattern matching by using the matching model determined in the step of determining.

12. A manufacturing method comprising:
each step of the image processing method according to claim 11;
a step of recognizing or inspecting a workpiece by using a result of the repeated step; and
a step of manufacturing a product from the workpiece by using information obtained in the step of recognizing or inspecting.

13. A non-transitory computer-readable recording medium storing a program that causes a computer to execute each step of the image processing method according to claim 1.

14. The image processing method according to claim 1, wherein the second spatial position is separated by more than ten pixels from the first spatial position.

15. The image processing method according to claim 1, wherein an image region of the provisional model disposed at the first spatial position has a first area, an image region of the provisional model disposed at the second spatial position has a second area (M), an overlap region between the first area and the second area has a third area (N), and the third area is smaller than 50% of the first area.

16. An image processing apparatus which executes each step of the image processing method according to claim 1, comprising:
a processor for performing the step of performing, the step of obtaining, and the step of evaluating; and
a memory for storing the plurality of matching scores and the evaluation value.

17. The image processing apparatus according to claim 16, further comprising a storage device for storing the plurality of provisional models.

18. A manufacturing system comprising:
the image processing apparatus according to claim 17; and
a manufacturing apparatus configured to perform a manufacturing process on a workpiece by using a result of pattern matching performed by the image processing apparatus on an image in which the workpiece is captured.

19. An image processing method comprising:
a step of preparing a plurality of provisional models for pattern matching which are generated by using a reference image in which a target object of the pattern matching is recorded;
a step of performing the pattern matching between each of the plurality of provisional models and each of a plurality of evaluation images in which the target object of the pattern matching is recorded, thus obtaining a plurality of matching scores between each of the plurality of provisional models and each of the plurality of evaluation images,
wherein the plurality of matching scores includes (i) a first matching score indicating a degree of similarity between one of the plurality of provisional models and one of the plurality of evaluation images, and (ii) a second matching score indicating a lower degree of similarity than the first matching score between the one of the plurality of provisional models and the one of the plurality of evaluation images;

a step of obtaining, for each of the plurality of provisional models, a first matching score group that is a set of a first matching scores each of which is the first matching score with respect to each of the plurality of evaluation images and a second matching score group that is a set of second matching scores each of which is the second matching score with respect to each of the plurality of evaluation images;

a step of calculating an evaluation value in accordance with a difference between a first value calculated from the first matching score group and a second value calculated from the second matching score group, wherein the first value corresponds an average value, a maximum value, or a minimum value of the first matching score group, and the second value corresponds an average value, a maximum value, or a minimum value of the second matching score group; and a step of determining a matching model from among the plurality of provisional models on a basis of the calculated evaluation value.

20. An image processing apparatus which execute each step of the image processing method according to claim 19, comprising:

a processor for performing the step of performing, the step of obtaining, and the step of evaluating; and a memory for storing the plurality of matching scores and the evaluation value.

* * * * *